United States Patent [19]

Gille et al.

[11] Patent Number: 4,479,175
[45] Date of Patent: Oct. 23, 1984

[54] PHASE MODULATED SWITCHMODE POWER AMPLIFIER AND WAVEFORM GENERATOR

[75] Inventors: Robert A. Gille, St. Paul; Norman G. Planer, Annandale; Zoltan Zansky, Roseville, all of Minn.

[73] Assignee: Honeywell Inc., Minneapolis, Minn.

[21] Appl. No.: 407,863

[22] Filed: Aug. 13, 1982

[51] Int. Cl.³ .............................................. H02M 1/14
[52] U.S. Cl. ..................................... 363/41; 363/159
[58] Field of Search ............... 318/599, 811; 363/8, 363/40, 41, 159, 160

[56] References Cited

U.S. PATENT DOCUMENTS 3,319,147  5/1967  Mapham ........................ 363/8
3,794,906  2/1974  Hoffman, Jr. et al. ............ 363/8
4,244,015  1/1981  Beebe ........................... 363/41 X
4,339,791  7/1982  Mitchell ........................ 363/41

FOREIGN PATENT DOCUMENTS 2629407  1/1978  Fed. Rep. of Germany ...... 363/8
0828365  5/1981  U.S.S.R. ........................ 363/41

Primary Examiner—William M. Shoop
Attorney, Agent, or Firm—Omund R. Dahle

[57] ABSTRACT

A phase modulated DC-to-AC or a DC-to-DC power converter utilizes input terminals connected to a source of power and output terminals connected to a suitable load. The transfer of power between the power source and the load or from the load back to the power source is accomplished by electronic switching that is phase displaced controlled in all four quadrants.

13 Claims, 16 Drawing Figures

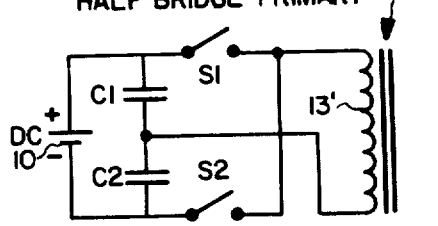
FIG. 4 HALF BRIDGE PRIMARY:
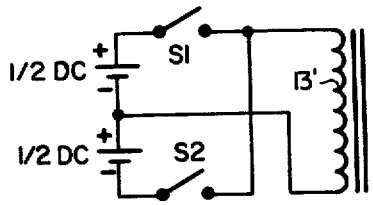
HALF BRIDGE PRIMARY WITH SPLIT POWER SOURCE:
FIG. 5
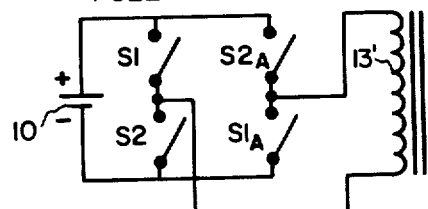
FULL BRIDGE PRIMARY:
FIG. 6
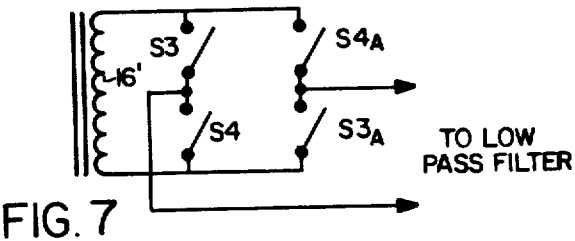
FULL BRIDGE SECONDARY:
FIG. 7
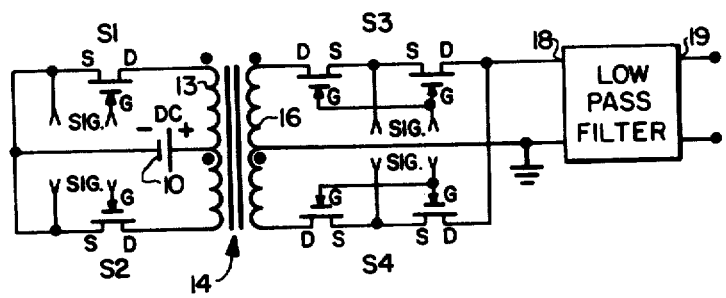
FIG. 8   POWER CIRCUIT
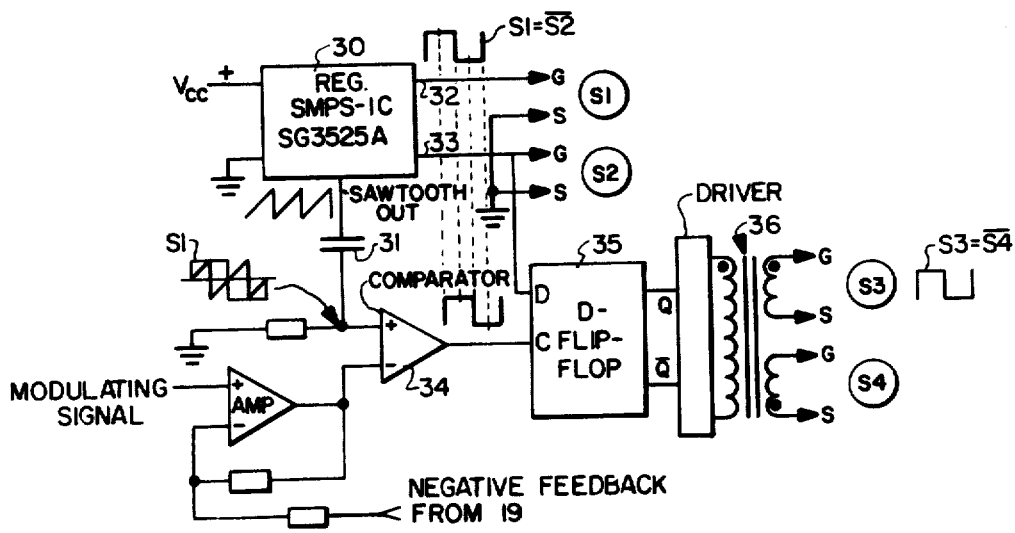
FIG. 9   PHASE MODULATED SWITCHING AMPLIFIER DRIVE CIRCUIT

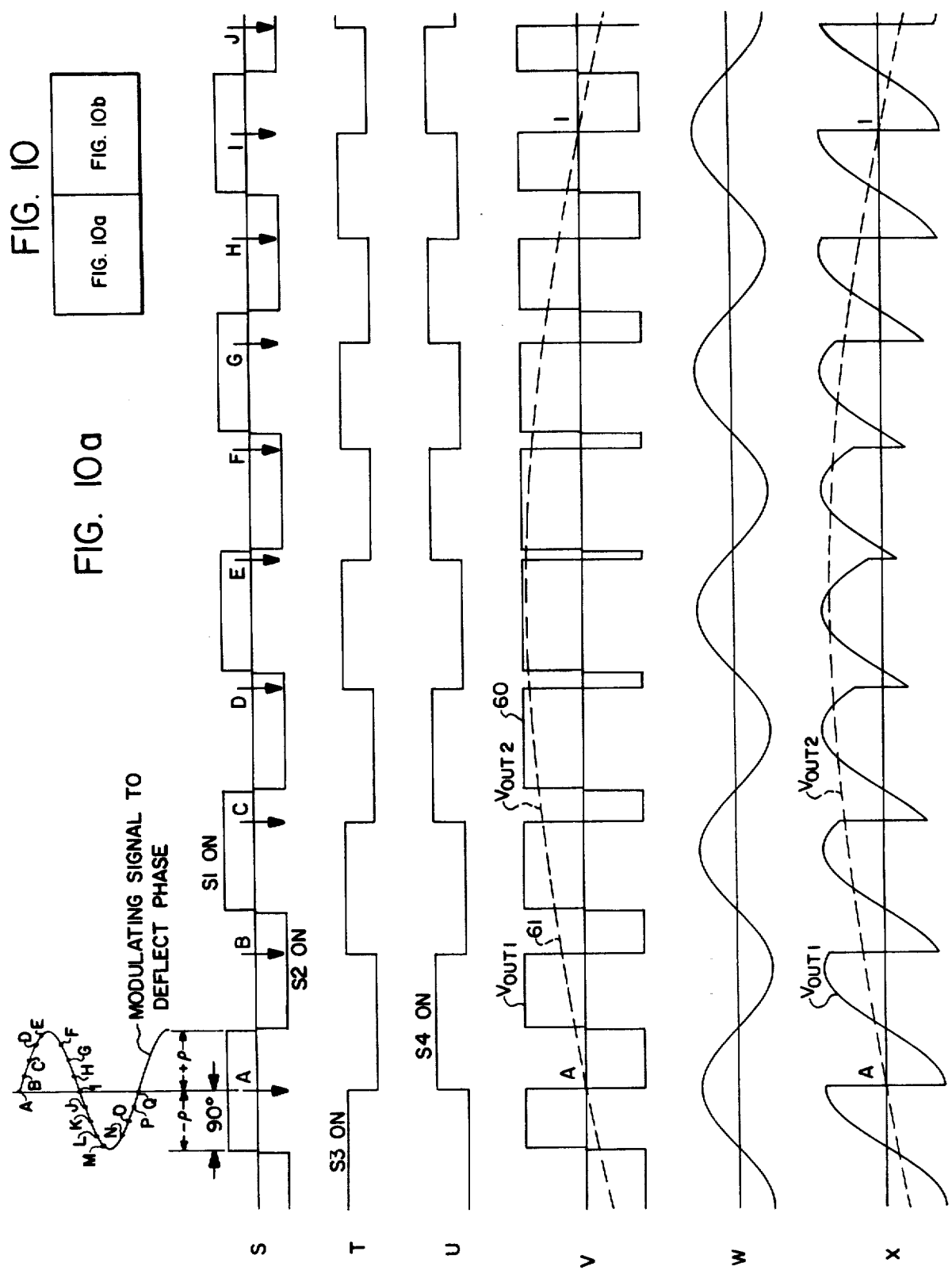

PHASE MODULATED SWITCHMODE POWER AMPLIFIER AND WAVEFORM GENERATOR

BACKGROUND AND SUMMARY OF THE INVENTION

The present invention is broadly directed to the field of high efficiency phase modulated DC-to-AC or DC-to-DC power converters (i.e. power amplifier).

In the prior art there have been DC-to-AC power converters utilizing pulse-width modulation such as is shown in the publication "Four Quadrant Bilateral Power Converter", by Paul U. Lind, GTE Automatic Electric Laboratories, in PCI Proceedings of March 1982, P142-150.

The present invention is an improvement over the prior art in the use of a phase modulated system in contrast to a pulse-width modulation system, the present phase modulating system overcoming many of the problems and limitations of the prior art. It is useful in DC-to-AC power conversion, and in DC-to-DC power conversion where all the DC outputs are individually regulated. The apparatus can convert DC to power of any frequency or voltage level. The apparatus provides four quadrant operation of the circuit so that it is usable in noninterruptable power supply applications in which when the battery voltage is low, the battery is charged backward through the circuit from the AC source. The invention is also advantageous for use in general amplifiers such as audio amplifiers and instrumentation amplifiers, in servodrivers, step motor drivers and the like.

BRIEF DESCRIPTION OF THE DRAWINGS

FIGS. 4-7 show modifications of the circuit of FIG. 1.

FIG. 8 is a more detailed schematic of FIG. 1.

FIG. 9 is a block diagram of the phase modulated switching device drive circuit.

DESCRIPTION

Figure 1:
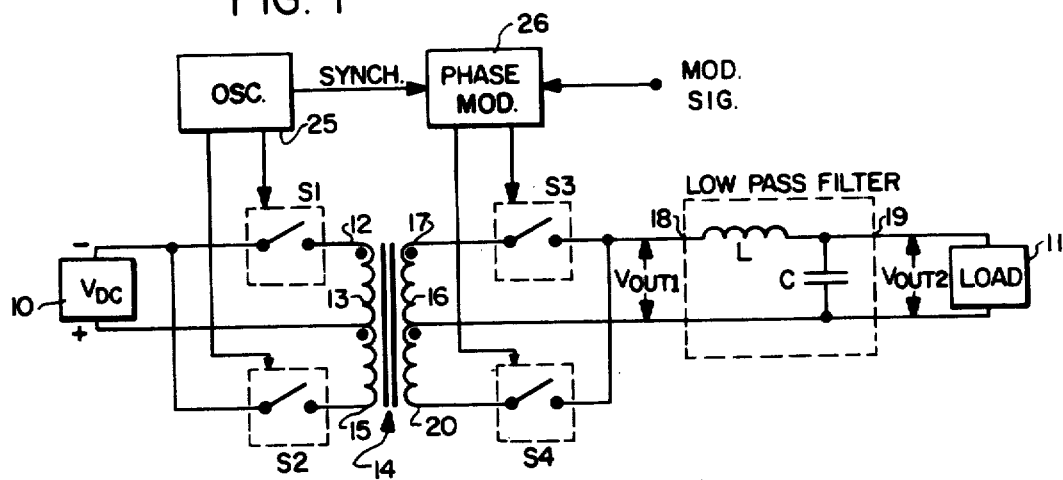
FIG. 1 is a block diagram of the present invention.
Figure 2:
FIG. 2 is a schematic representation of the switching devices.

Referring now to the block diagram of FIG. 1 there is shown a power source 10 of direct voltage which is to be efficiently converted into an AC power output for supplying a suitable load means 11. One terminal of the source 10 is connected through a switching device S1 to end terminal 12 of a center-tapped primary winding 13 of a power transformer 14, and the same one source terminal is also connected through a switching device S2 to opposite end terminal 15 of winding 13. The center-tap of winding 13 is connected to the other terminal of source 10. A center-tapped secondary winding 16 has an end terminal 17 connected through a bidirectional switch S3 to the input 18 of a conventional low-pass filter. The output of filter 19 is connected to the load 11. The load 11 may be in certain circumstances the power lines of an AC source. The other end terminal 20 of winding 16 is also connected through a bidirectional switch S4 to the filter input 18. The switching devices S1 and S2 usually are unidirectional switches and a typical embodiment is shown in FIG. 2(a). This embodiment comprises an n-channel FET fabricated to have an internal inverse conducting diode across the drain-source terminals. The switching devices S3 and S4 are bidirectional switches and a typical embodiment may take the form shown in FIG. 2(b) also having the internal inverse connected diodes across each FET. Although power FETs are shown in FIG. 2, the switches S1, S2, S3 and S4 may also comprise transistors, regular or gate turn off SCRs, power tubes and the like.

Figure 3:
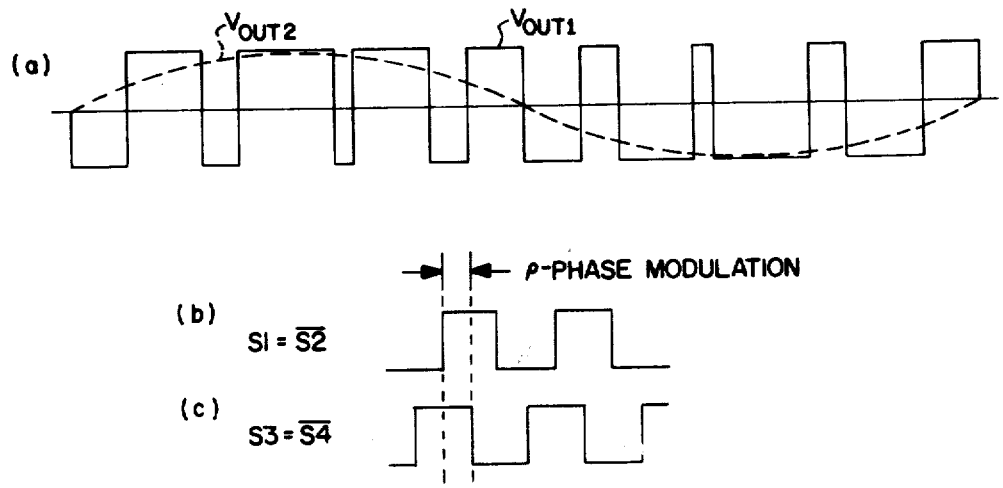
FIG. 3 shows various waveforms of the circuit.

An oscillator 25 provides an electrical switching signal to switches S1 and S2. Broadly speaking, the switching signal may preferably have the general nature of a symmetrical square wave. FIG. 3b shows a switching signal having the general nature of a square wave being used to switch S1 and S2 with S1 being conductive while S2 is off (S1=$\overline{S2}$) and vice versa. The oscillator also provides a sync signal to a phase modulator 26. The output waveform of the phase modulator is nominally 90° displaced (as shown in FIG. 3c) from that of the oscillator with zero modulating input, however the phase may be deflected (i.e. advanced or retarded) from the nominal 90° setting by a proper signal to the "mod sig" input. This output waveform from the phase modulator 26 is connected to control the switches S3 and S4. The switches S3 and S4 are connected to be switched so that S3 is conductive while S4 is off (S3=$\overline{S4}$) and vice versa.

Considering the operation of the block diagram of FIG. 1, the switches S1 and S2 are continually opened and closed with a 100% duty cycle square wave drive, 180° apart, thus each switch is conducting fifty percent of the time whereby a current from the positive source terminal flows successively into primary winding terminals 12 and then 15 and an AC voltage is induced at secondary winding 16. The square wave drive may be minumum two times the maximum modulating signal frequency, usually in the 20 KHz to 30 KHz range up to as high as the speed of the switching devices will allow. One or the other of the bidirectional switches S3 and S4 is always conductive as switched by the phase modulator output, that is, switches S3 and S4 are opened and closed, 180° apart, with a square wave drive from modulator 26. The phase modulator 26 has the same carrier frequency as the oscillator, but with modulated phase in respect to S1 and S2 centered around a 90° center phase difference. The resulting $V_{out}$ is a pulse with modulated square wave ($V_{out}1$) which after the low-pass filter at output 19 will reproduce the amplified modulating signal ($V_{out}2$) as shown generally in FIG. 3a.

The basic system as shown in FIG. 1 has a center-tapped primary winding circuit and a center-tapped secondary winding circuit in a push-pull configuration on the high frequency power conversion transformer. Other modifications of the primary and secondary circuits may be used and several modifications are shown in FIGS. 4-7. In FIG. 4 there is shown the switches S1 and S2 working into a non-tapped primary winding 13' of transformer 14'. This modification may be referred to as a half-bridge primary with a non-split power source. Capacitors C1 and C2 are added to this circuit to complete the circuits so that when switch S1 closes current flows from the positive terminal of the source through S1, down through primary 13' and through C2 to the negative terminal of the source. When the switches reverse, current flows down through C1, upwardly through 13' and through S2 back to the negative source terminal. FIG. 5 is a modification showing a half-bridge primary with a split power source, FIG. 6 is a full bridge primary where switches S1 and S1A close simultaneously followed by switches S2 and S2A closing together in the second half cycle of the operation. In FIG. 7 a modification of the secondary circuit of FIG. 1 is shown in which instead of center-tapped secondary winding 16, a non-tapped winding 16' is connected to full bridge secondary switches S3, S4, S3A and S4A with S4 and S4A closing one half cycle and S3 and S3A closing on the alternate half cycle. These alternate connections are shown to emphasize that the invention is not intended to be limited to the specific circuit shown in FIG. 1. In all the described configurations of the invention, the specified input DC power source 10 may be replaced by an AC source as well for some applications. In that case the switch control circuit has to be modified to reverse the output polarity of the inverter at any time the AC power source changes polarity in order to obtain its operation as though it had a DC power source. Also the input switches S1 and S2 have to be bidirectional and the other restriction is that the output frequency of the inverter be only the even number multiplicity of the AC power source.

The power circuit of FIG. 1 taken together with the switching components of FIG. 2 are shown in more detail in FIG. 8. The signal input circuits to the FETs which comprise the switches S1, S2, S3 and S4 are shown as well as the source, drain and gate terminals being identified. The FETs selected are n-channel devices and require a signal at the gate to be switched "on".

Figure 10B:
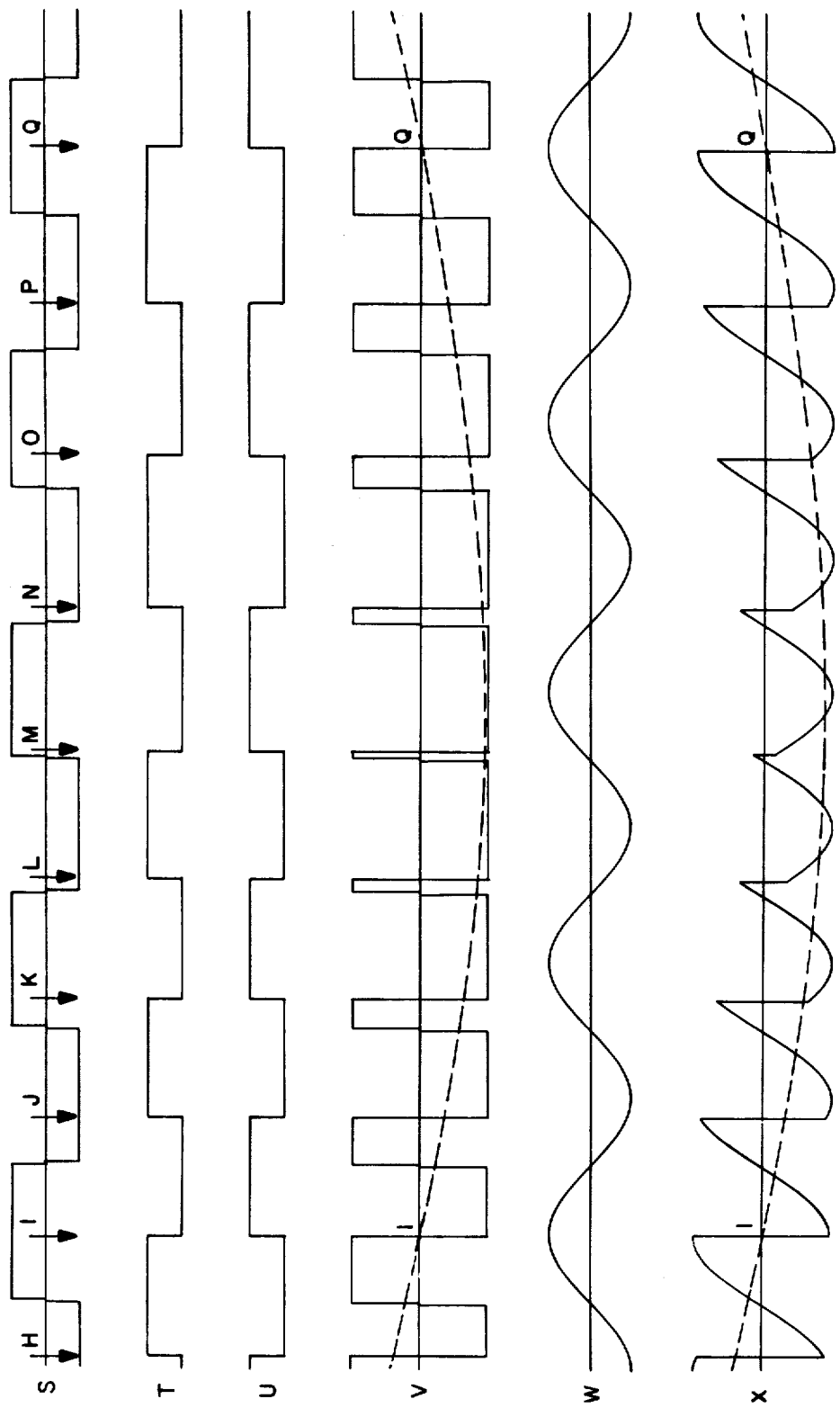
FIGS. 10 and 11 are graphical representations of the relation between various operating waveforms in the invention.
Figure 11:
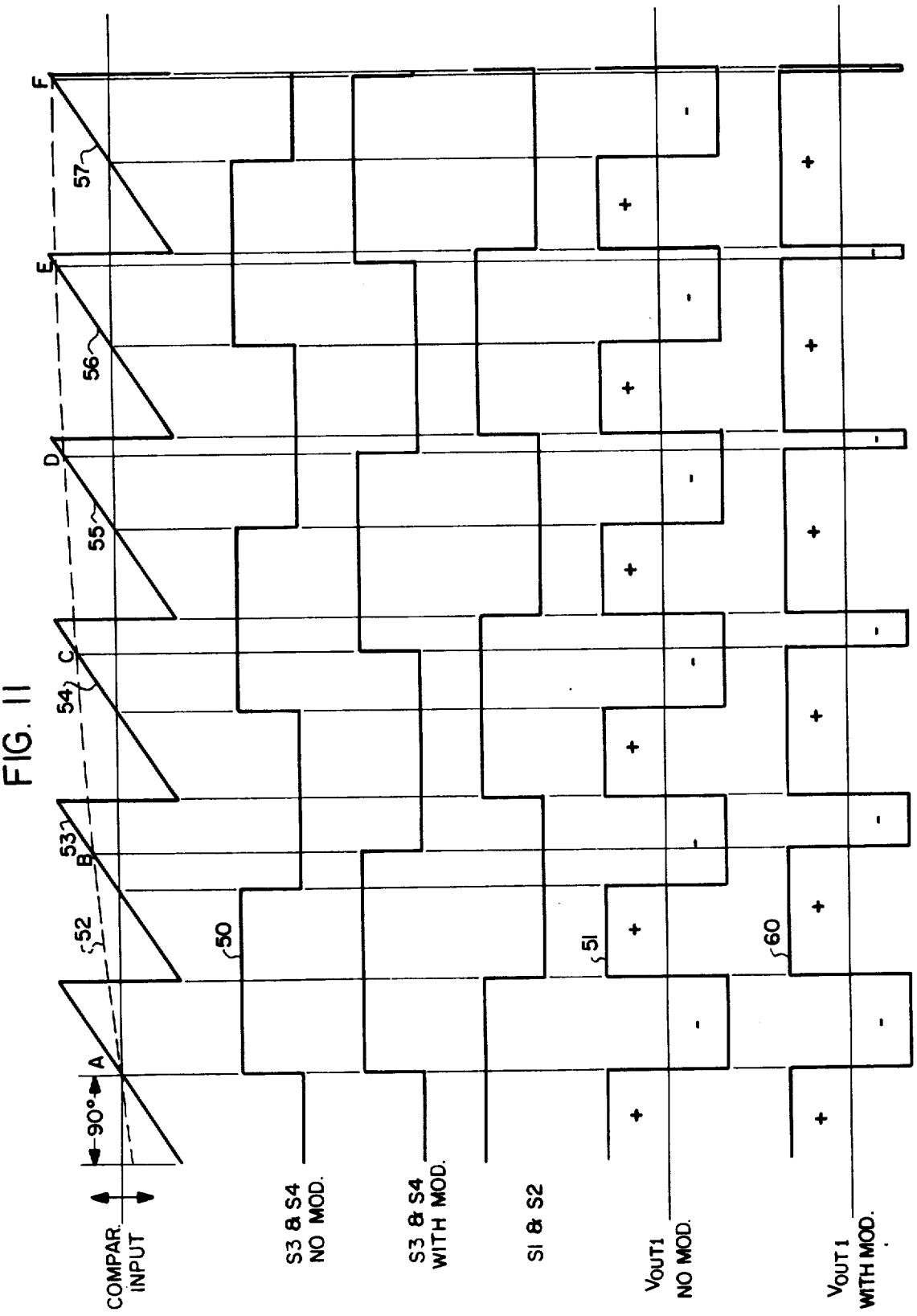
Figure 13:
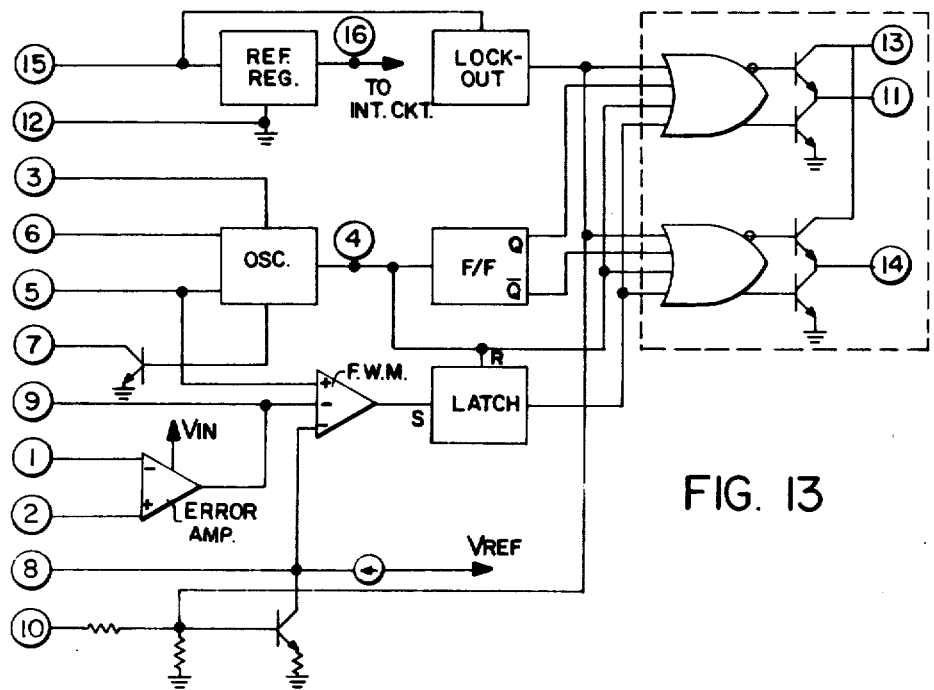
FIG. 13 is a schematic diagram of the SMPS regulator used in the circuit of FIG. 9.

In FIG. 9 there is disclosed more details of the phase modulated switching amplifier drive circuit including the oscillator 25 and the phase modulator 26 of FIG. 1, and which generates several signals including a square wave carrier signal and a sawtooth signal, and a phase shifted square wave. A switchmode power supply regulator IC 30 (SMPS-IC) in FIG. 9 is shown in the form of an integrated circuit such as a Silicon General type SG3525A which device Silicon General titles a "regulating pulse width modulator". The block diagram of the SG3525A is shown in more detail in FIG. 13. As utilized in the present invention the SG3525A is not used as a pulse-width modulator, but is used in its 100% duty cycle or 100% pulse-width mode to provide a sawtooth ramp signal from the oscillator and a square wave reference carrier wave. The waveforms from the phase modulated switching amplifier drive circuit of FIG. 9 are shown in FIG. 10 (assemble 10a and 10b edge to edge). Thus the square wave carrier signal, curve S (FIG. 10), outputs from conductors 32 and 33 to inversely drive switches S1 and S2. Its oscillator is actually a sawtooth generator and thus in FIG. 9 a sawtooth output signal from SMPS regulator 30 is coupled through capacitor 31 to one input of a comparator 34. The linear sawtooth signal in the absence of a modulating signal is centered around a reference potential at the comparator input to provide a 90° delay in the switching square wave for S3 and S4 in respect to the carrier waveform. This can be seen in FIG. 10 as well as in FIG. 11, curve 50, point A. The output of the comparator 34 drives a D flip-flop 35 the outputs Q and $\bar{Q}$ of which are coupled by transformer 36 to inversely drive the switches S3 and S4. With a 90° delay of the switching of S3 and S4 with respect to S1 and S2, the positive and negative waveforms are of equal area at $V_{out}1$, as shown in curve 51 and thus $V_{out}2$ would be zero. The dashed line, curve 52, in FIG. 11 shows a sine wave modulating signal applied to the comparator input having the effect of shifting the reference point in the sawtooth ramp at which the sawtooth signal crosses curve 52 to cause switching. Thus, in succeeding sawtooth ramps 53, 54, 55, 56 and 57 it can be seen that the switching points B, C, D, E and F are later in the respective ramp cycle. This provides an output $V_{out}1$ waveform 60 in which the positive voltage is of greater area than the negative. While FIG. 11 only shows about a quarter cycle of the modulating signal, by referring back to FIG. 10, curve 61, the resulting output $V_{out}2$ of such a modulating signal can be seen.

In FIG. 10, curve S, it can be seen that while point A occurs at 90° past the "S1 on" switching point, because the modulating signal at A was instantaneously zero, the succeeding points B, C, D, and E arrive later in their respective cycles with the increasing level of a positive modulating signal. The curves in FIG. 10, for explanatory purposes, show a large phase shift from one carrier square wave to the adjacent one. In actual practice the carrier frequency is usually so much higher than the modulating frequency that many more square wave pulses would occur during one cycle of the modulating signal and only a small phase shift would occur from one square wave to the adjacent square wave.

Although a square wave carrier is shown and described as a preferred embodiment, the invention is not so limited. The primary switching circuit of FIG. 1 may be modified to be resonant with the addition of a capacitor connected across the transformer primary which will resonate with the transformer primary inductance and an inductance in series with the center-tap to provide a constant current power supply source, and with the substitution of bidirectional switches utilized in positions S1 and S2 to provide a more nearly sinusoidal reference carrier wave. In FIG. 10, curve W, such a sinusoidal carrier wave is shown which may be substituted for the square wave shown in curve S. The switching output waveform $V_{out}1$ will then be modified and will look more like that shown in curve X.

The described apparatus has a number of advantages over previous art; less number of switching elements are needed with less power dissipation; no pulse with modulation; therefore no ringing in the TX, and no suppression needed. Overall less expensive, less power loss and cleaner waveforms than previous art. A further important feature of the circuit arises from the four quadrant operation of the circuit. When the output 19 of the power circuit is connected to a "load" 11 (which load is in this instance an AC source), and when the battery 10 voltage is low, the battery will be charged backward through the power circuit from the AC source. This is important in noninterruptable power supply applications, and the present circuit eliminates a separate battery charger and its control and supervisory circuits.

Figure 12:
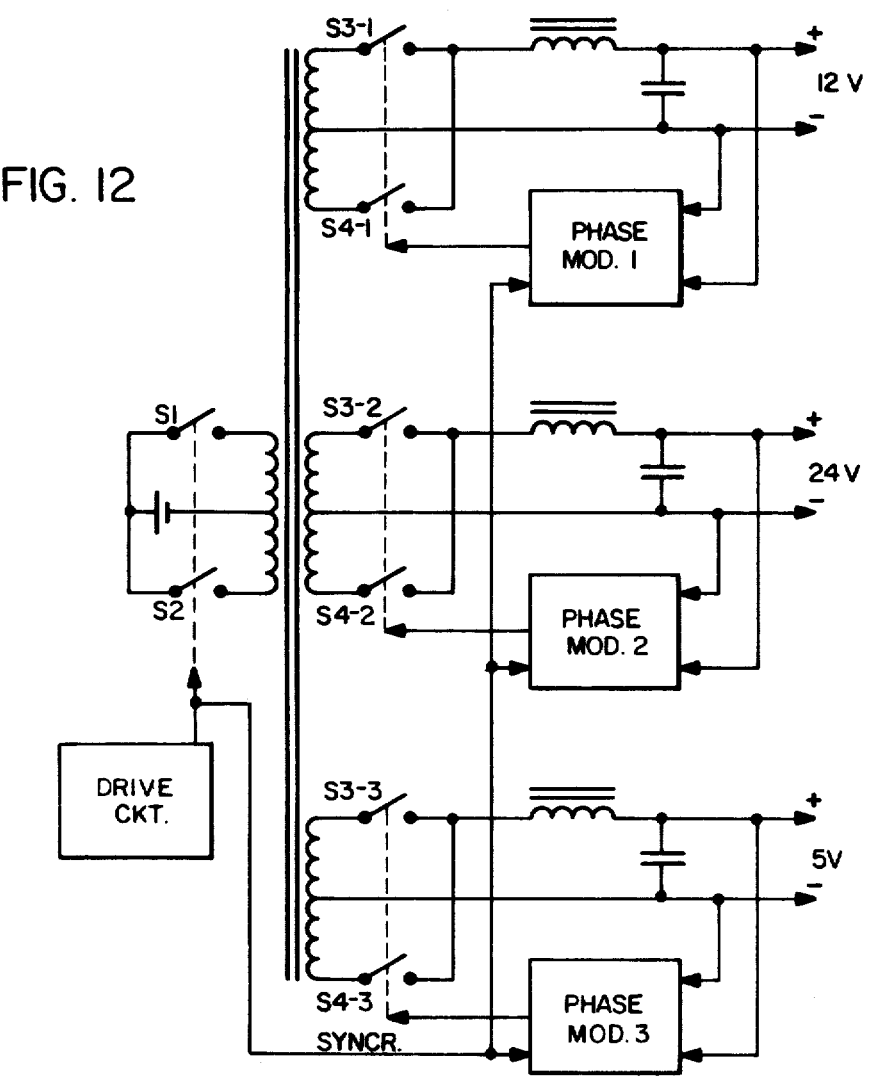
FIG. 12 is a block diagram of a DC-to-DC power circuit.

The amplified modulating signal (from DC up to one tenth of the carrier frequency) can be recovered amplified at the output of the low pass filter at any linear or nonlinear inductive or capacitive load. Negative feedback from output 19 of FIG. 8 to inverse terminal of input amplifier of FIG. 9 may be provided to reduce distortion of the modulating signal at the output. The described circuits can be used for DC-to-DC power conversion as well when DC modulating signal is used. In DC-to-DC conversion there is overcome a limitation of present day switching power supplies which regulate only one of different DC output voltages required. Referring now to FIG. 12 there is shown a DC-to-DC power converter having DC outputs of 24 V, 12 V, and 5 V, each individually regulated by the phase modulator of this invention. All the switches operate with 100% duty cycle or pulse-width; there is no pulse-width modulation occurring. In most of the power conversion applications, a switching rate of 20-30 KHz will probably be desirable, however when the apparatus is to be utilized as an audio amplifier the carrier frequency is higher, for example in the range of 200 KHz to 500 KHz.

HARMONIC DISTORTION REDUCTION

Figure 14:
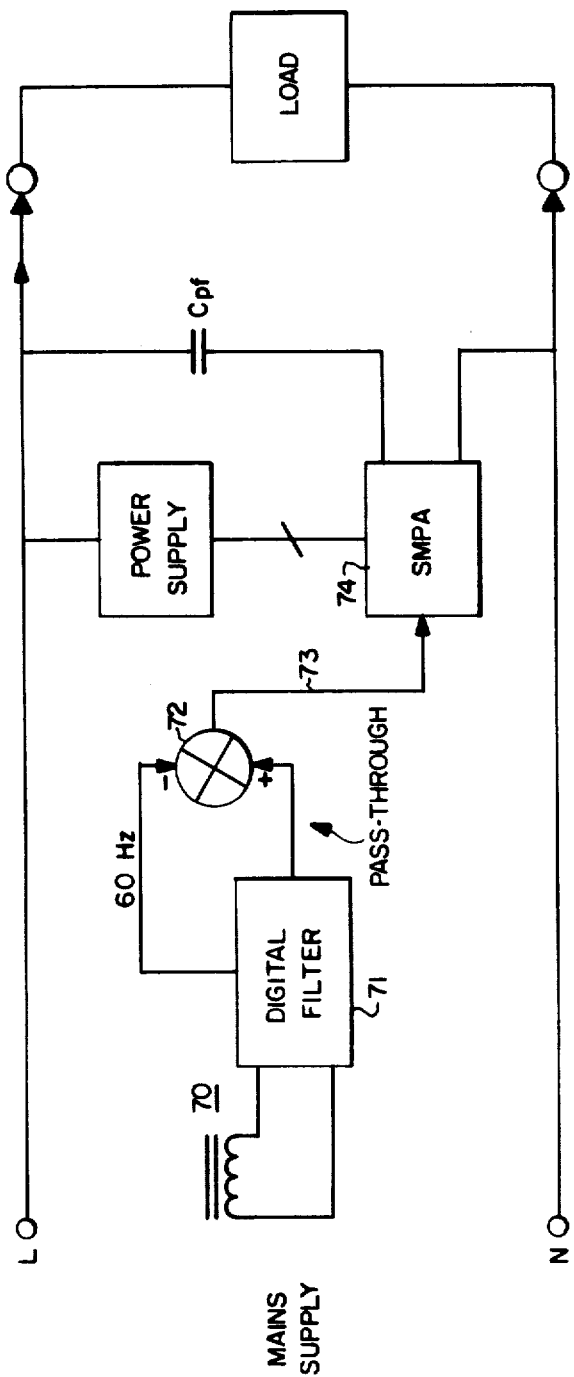
FIG. 14 is a block diagram of the invention as used for mains harmonic distortion reduction.

The switchmode power amplifiers (SMPA) described in this invention are also useful in the reduction of harmonics on power lines. Harmonics are a rapidly growing problem for suppliers and users of electrical energy as a result of the addition of nonlinear electrical loads to supply mains. Some examples of such loads are motor controls, intermittent electrical loading, and various types of rectifier circuitry. In the present invention there is described apparatus for reducing current harmonics at their source. Recent attempts to solve harmonics problem have concentrated on the use of active filter devices to compensate for the generation of harmonics disturbances. Applicants switchmode power amplifier is described in FIG. 14 to function as a harmonic cancellation device in a true feedback control sense to reduce harmonics on the AC mains using the switchmode amplifier.

A current sensing circuit 70 measures the mains supply current and any harmonic content thereof. The signal is introduced to the digital filter 71 after appropriate scaling. The digital filter extracts a true in phase sinusoidal 60 Hz signal from the measured current waveform. This extracted signal 72 is subtracted from the main supply current measurement to form a measurement of the harmonic residual. It is this residual current measurement which is to be reduced or eliminated. The residual current measurement on line 73 is used to drive the switchmode power amplifier 74 to reproduce the residual harmonic current with opposite (cancelling) phase in the SMPA output. This cancelling current is then introduced into the load's supply circuit to reduce/eliminate the harmonic residual which would normally be reflected back into the mains supply. This harmonic-reduction filter must be able to handle the power contained in the harmonics generated by the load; typically about 5 to 10 percent of the load power.

The embodiments of the invention in which an exclusive property or right is claimed are defined as follows:

1. A phase modulated switchmode amplifier apparatus comprising:
   input power terminals adapted to be connected to a source of electrical power;
   transformer means having primary winding and secondary winding means;
   first electronic switch means for connecting said primary winding means to said input power terminals;
   reference signal means connected for selectively switching said first switch means so that an alternating type current is induced in said secondary winding means;
   an output circuit adapted to be connected to suitable load means;
   second electronic switch means connecting said secondary winding means to said output circuit;
   second phase-displaced signal means connected for switching said second switch means, said second signal normally being phase-displaced by 90° from said reference signal to cause switching of said second switch means to occur 90° displaced from the switching of said first switch means; and,
   phase modulation means connected to said second signal means for shifting the phase displacement of said second signal to 90°±ρ° in response to a modulation signal where ρ is any number of degrees from 0 to 90°.

2. The apparatus according to claim 1 in which said output circuit includes a low-pass filter.

3. The apparatus according to claim 1 in which the input power terminals are connected to a DC source.

4. The apparatus according to claim 1 in which the first electronic switch means comprise alternately conducting first and second field effect transistors.

5. The apparatus according to claim 1 in which the second electronic switch means comprises alternately conducting third and fourth bidirectional field effect transistor means.

6. The apparatus according to claim 1 in which the reference signal is a square wave.

7. The apparatus according to claim 1 in which the reference signal and the second phase-displaced signal are square waves.

8. The apparatus according to claim 1 in which the reference signal is of a frequency in the range of 20 KHz to 30 KHz.

9. The apparatus according to claim 1 in which the reference signal is of a frequency which is a minimum of ten times the maximum modulating frequency.

10. A phase modulated switchmode amplifier apparatus comprising:
    input power terminals adapted to be connected to a source of electrical power;
    transformer means having primary winding and secondary winding means;
    first and second electronic switch means for connecting said primary winding means to said input power terminals;
    reference signal means connected in controlling relation to said first and second switch means for alternately switching "on" said first and second switch means so that an alternating type current is induced in said secondary winding means; an output circuit adapted to be connected to suitable load means;
    third and fourth electronic switch means connecting said secondary winding means to said output circuit;
    second phase-displaced signal means connected to said third and fourth switch means for inversely switching said third and fourth switch means, said second signal normally being phase-displaced by 90° from said reference signal to cause switching of said third and fourth switch means to occur 90° displaced from the switching of said first and second switch means; and,
    phase modulation means connected to said second signal means for shifting the phase displacement of said second signal to 90°±ρ° in response to a modulation signal where ρ is any number of degrees from 0 to 90.

11. The apparatus according to claim 1 or 10 in which the phase modulation means includes a switching comparator circuit, the comparator having as one input a sawtooth signal voltage synchronized with the reference signal means and having as another input the modulation signal, the comparator being operative so that upon the modulation signal being reached by the sawtooth signal voltage, a switching occurs defining said phase displacement.

12. The apparatus according to claim 10 in which the first, second, third, and fourth electronic switch means are field effect transistor means.

13. Harmonic distortion reduction apparatus for AC power lines comprising:
  current sensing means for measuring the power lines supply current and any harmonic content thereof;
  digital filter means for extracting a true sinusoidal signal from the measured current waveform;
  subtraction means for subtracting the extracted true sinusoidal signal from the measured current waveform to form a measurement of the harmonic residual;
  switchmode power amplifier means to reproduce the residual harmonic current with opposite phase for introduction into said power lines, said switchmode power amplifier means comprising;
  input power terminals adapted to be connected to a source of electrical power;
  transformer means having primary winding and secondary winding means;
  first electronic switch means for connecting said primary winding means to said input power terminals;
  reference signal means connected for selectively switching said first switch means so that an alternating type current is induced in said secondary winding means;
  an output circuit adapted to be connected to said power lines for introducing the cancelling harmonic current into said power lines;
  second electronic switch means connecting said secondary winding means to said output circuit;
  second phase-displaced signal means connected for switching said second switch means, said second signal normally being phase-displaced by 90° from said reference signal to cause switching of said second switch means to occur 90° displaced from the switching of said first switch means; and,
  phase modulation means connected to said second signal means for shifting the phase displacement of said second signal to 90°±ρ° in response to a modulation signal where ρ is any number of degrees from 0 to 90.

* * * * *